United States Patent [19]

Yanagida et al.

[11] 4,313,141
[45] Jan. 26, 1982

[54] POSITION SHIFT APPARATUS

[75] Inventors: Seiichi Yanagida, Hiratsuka; Hisaharu Takeuchi, Kawasaki; Masamitu Nishina, Yokohama, all of Japan

[73] Assignee: Tokyo Shibaura Denki Kabushiki Kaisha, Kawasaki, Japan

[21] Appl. No.: 98,691

[22] Filed: Nov. 29, 1979

[30] Foreign Application Priority Data

Nov. 30, 1978 [JP] Japan ................ 53/147273

[51] Int. Cl.³ .................. G11B 5/55; G11B 21/10
[52] U.S. Cl. ............................. 360/78; 360/106
[58] Field of Search ............. 360/78, 106, 77, 69, 360/90, 33

[56] References Cited

U.S. PATENT DOCUMENTS

| | | | |
|---|---|---|---|
| 4,000,518 | 12/1976 | Stearns | 360/63 |
| 4,020,506 | 4/1977 | Barrett et al. | 360/137 |
| 4,144,549 | 3/1979 | Burdorf et al. | 360/78 |
| 4,210,959 | 7/1980 | Wozniak | 360/78 |

FOREIGN PATENT DOCUMENTS 2327031 5/1973 Fed. Rep. of Germany ........ 360/78

OTHER PUBLICATIONS

IBM Tech. Disc. Bull., D. S. Proper, Accurately Positioning Transducers with Respect to Rotating Disks, vol. 18, No. 7, Dec. 1975, p. 2066.
IBM Tech. Disc. Bull., F. G. Anders, Software-Hardware Dual Mode Servo, vol. 20, No. 1, Jun. 1977, pp. 63-64.

*Primary Examiner*—Alfred H. Eddleman
*Attorney, Agent, or Firm*—Oblon, Fisher, Spivak, McClelland & Maier

[57] ABSTRACT

A position shift apparatus having an actuator section for moving up and down a magnetic head through a screw feeding, and a control section in which, when the screw feeding is made in the up direction, it is made by a given distance up to target position and, when in the down direction, it is made beyond the target position, and then is again made by the distance exceeding the target position in the up direction. Even if the head is positioned on either the lower or the upper side, the head is screw-fed toward the target position always in the up direction.

15 Claims, 19 Drawing Figures

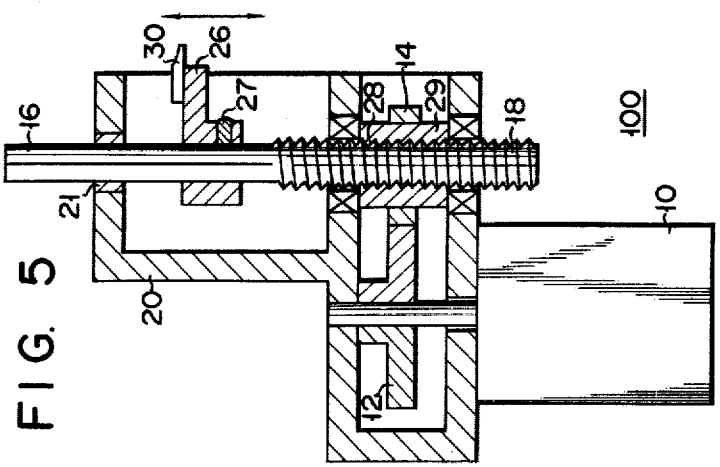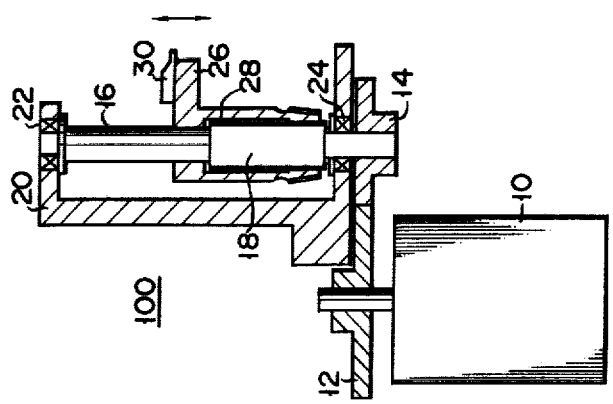

POSITION SHIFT APPARATUS

This invention relates to a head shift apparatus used in a fixed head type video signal recording system, for example.

A video tape recorder (VTR), which has been used commonly, employs a rotating head to provide a given relative speed of the rotating head to a tape. A so-called fixed head type VTR has been proposed recently, in which the tape runs at high speed, for example, several meters per second, and a fixed head is used for recording and reproducing a video signal. In this type VTR, a number of tracks are arranged in the direction of the tape-width for a long time recording of video signals. Because of this track arrangement on the tape, the head must be moved along the tape-width path. To this end, a screw feeding mechanism capable of accurately feeding the fixed head in the tape-width direction has been employed. The screw feeding mechanism, however, involves the following problems. The presence of a gap between the internal and the external threads possibly causes a backlash therebetween, so that the tracking operation of the head does not go well. In positioning the head at a target track position, the track positioned by moving up the head is frequently now coincident with that by moving down the head. Particularly, in case where the width of each track is narrow, cross-talk from the adjacent track or tracks is apt to occur due to the presence of the backlash. The result is degradations of the fidelity in reproducing the recorded video signal, and S/N ratio, and more adversely asynchronization of the video signal.

One of the approaches to reduce the backlash is such that a split nut is used for the internal thread and tightened by a tightening nut thereby to remove a gap between the internal and external threads. Another approach additionally uses an auxiliary nut associated with the internal thread (main nut). To remove the backlash, the main and auxiliary nuts are oppositely pulled by springs.

The former approach radially presses the internal thread against the external one. The latter approach axially presses the internal thread against the auxiliary one. Accordingly, the friction load is large in both the approaches. Therefore, to rotate a rod with the external thread, a large output torque is required for a pulse motor for rotating the rod. The requirement of the large torque necessarily makes the physical dimension of the pulse motor large, and needs a large output of the motor driver. This problem is serious in making the VTR small in size.

Accordingly, an object of the invention is to provide a head shift apparatus capable of accurately positioning a magnetic head at a target position by an actuator with a small torque.

In brief, with a usual type head moving mechanism according to the invention, the track is selectively positioned at a target track position through only the one-way movement of the head. More specifically, in shifting the head to a desired or target track position, if the head is below the target track, the head is simply moved up toward the target track, while, if the head is above the target track, the head is once moved down below the target track and then moved up again toward the target track.

Since the track selecting is performed in one-way manner, the same backlash condition may be ensured for every way of the track selection. As a consequence, the head may be accurately positioned at any target track.

Other objects and features of the invention will be apparent from the following description taken in connection with the accompanying drawings, in which:

FIG. 1 shows a cross sectional view of an actuator section for shifting up and down a head by a pulse motor where the head moves up and down, being fixed to the internal thread;

FIGS. 2A to 2C illustrate examples of the head track movement after the power ON;

Figure 2:
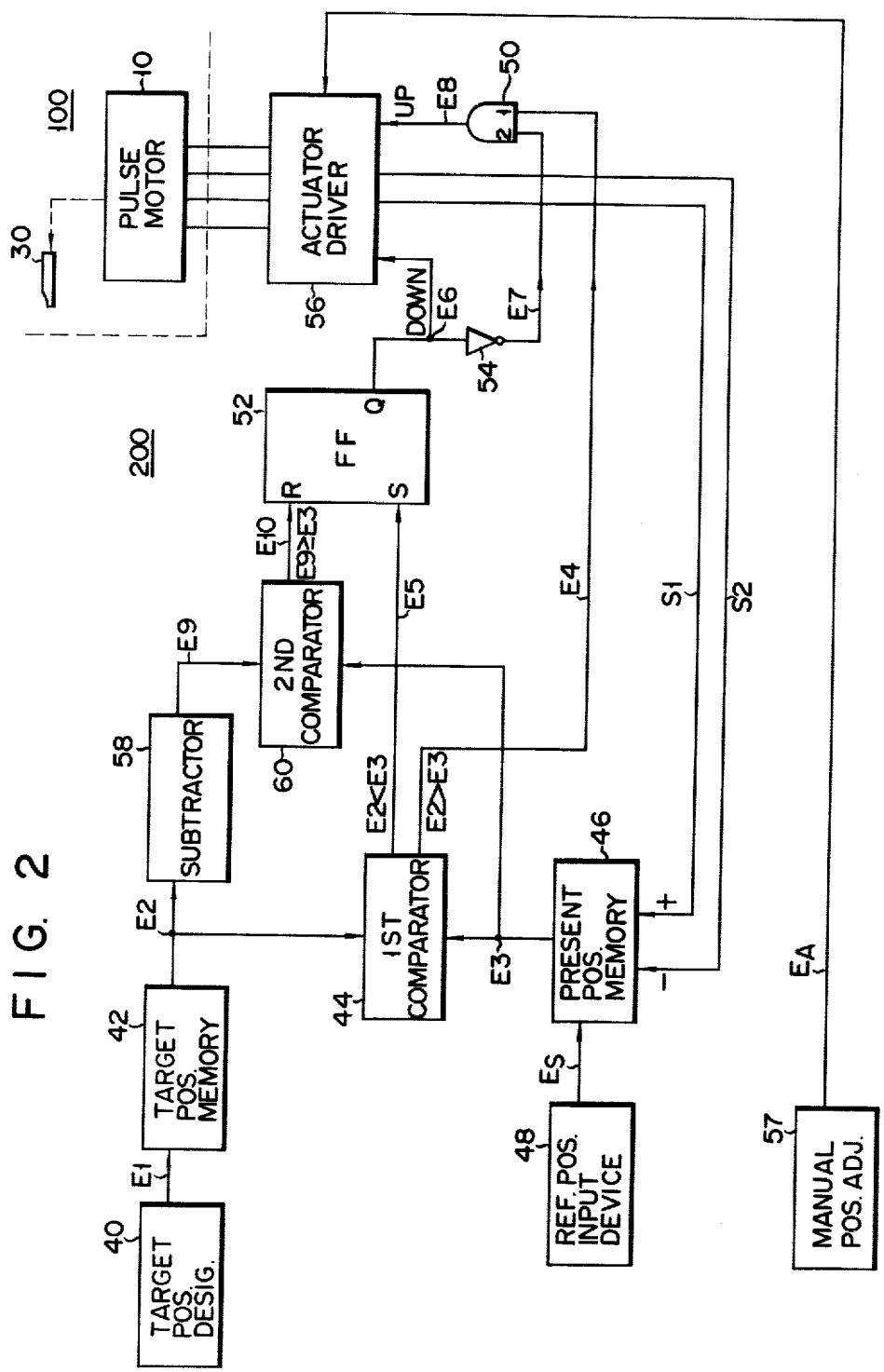
FIG. 2 shows a block diagram of a control section for driving and controlling the actuator section shown in FIG. 1.
Figure 2A:
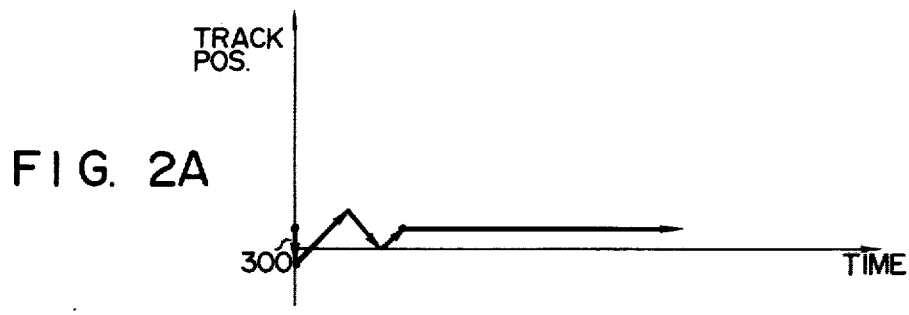
Figure 2B:
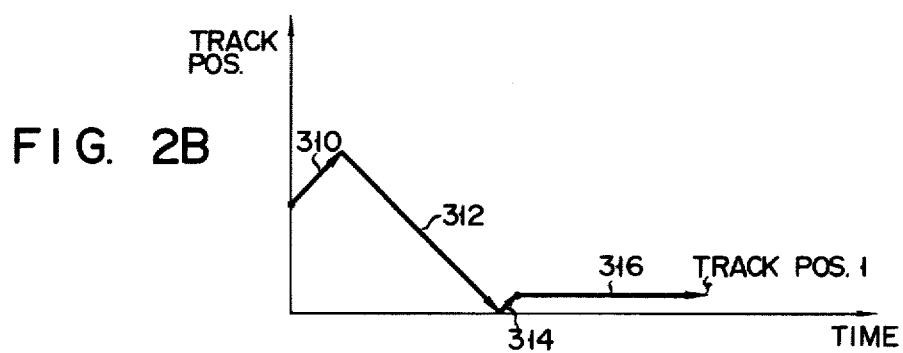
Figure 2C:
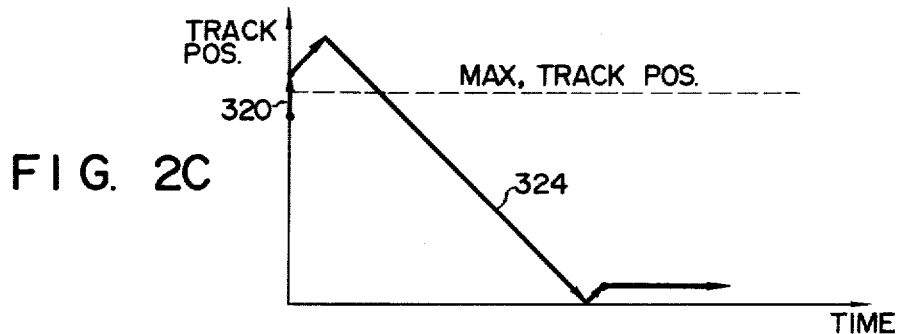
Figure 9A:
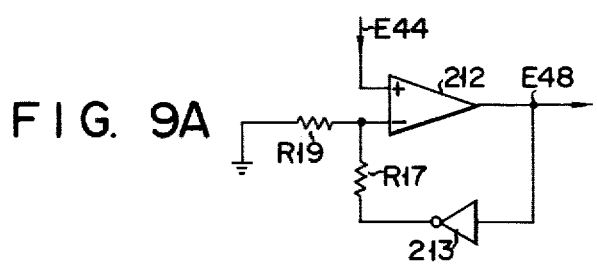
Figure 2D:
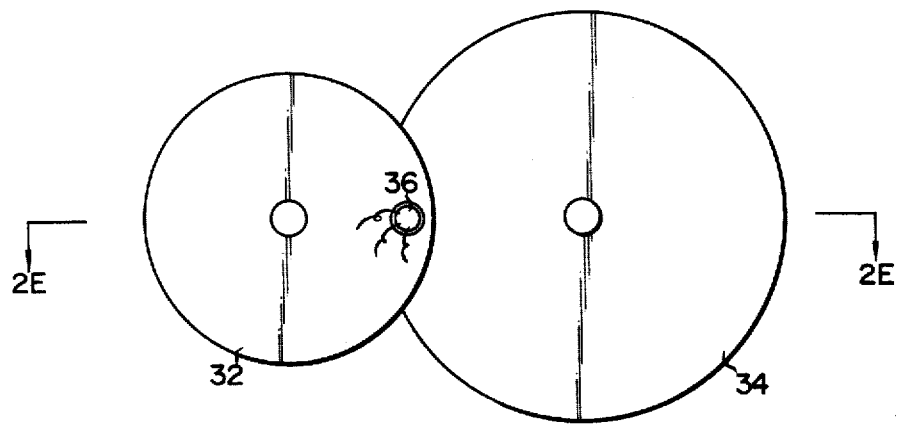
FIGS. 2D and 2E show an embodiment of a 0th track detector applicable to the reference position input unit (device) where FIG. 2E corresponds to the cross-section along the line 2E—2E in FIG. 2D.
Figure 2E:
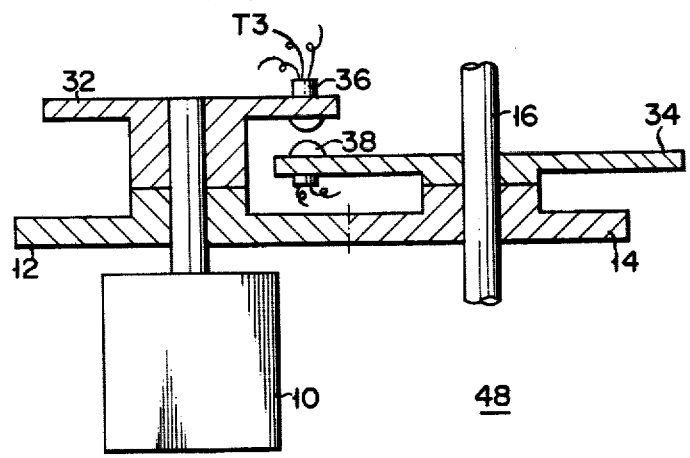
Figure 2F:
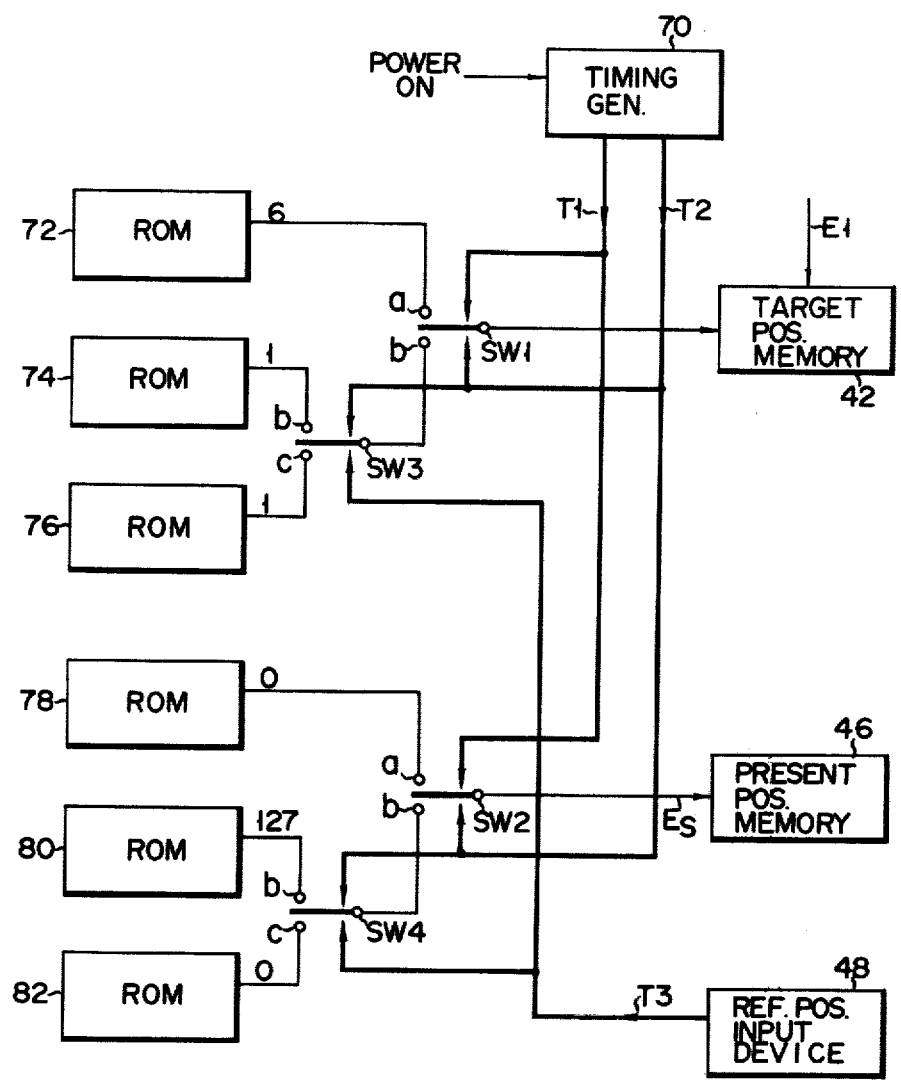
Figure 2G:
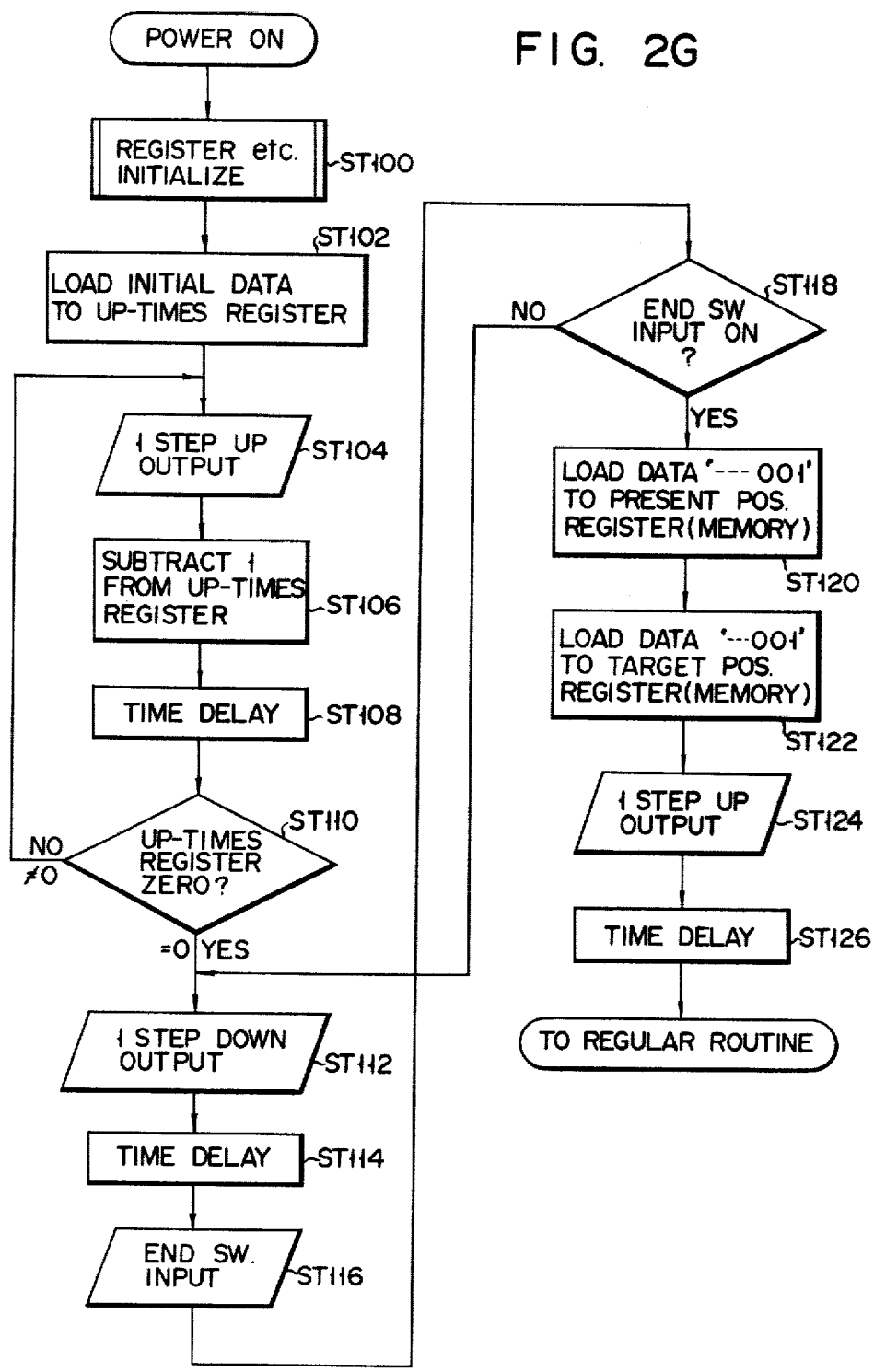
Figure 4:
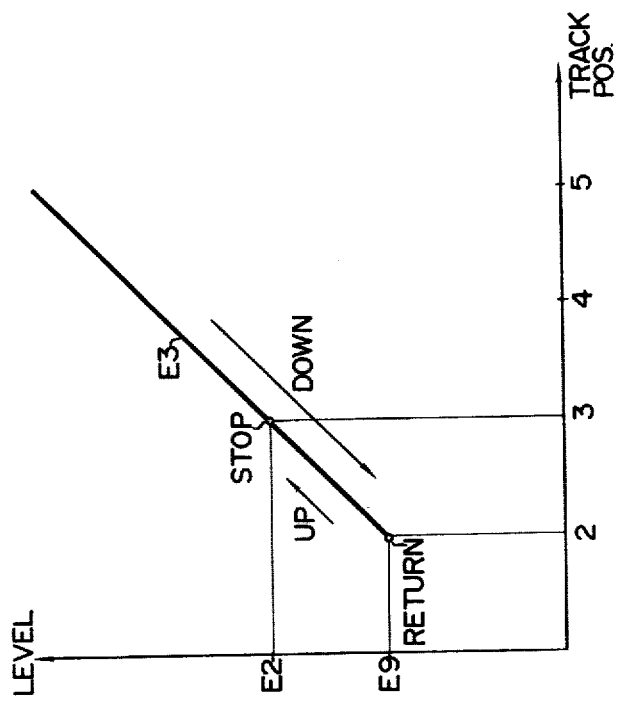
Figure 3:
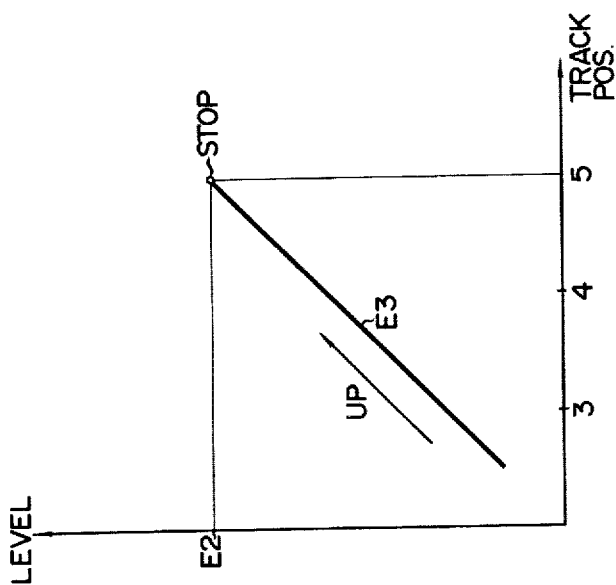
Figure 7:
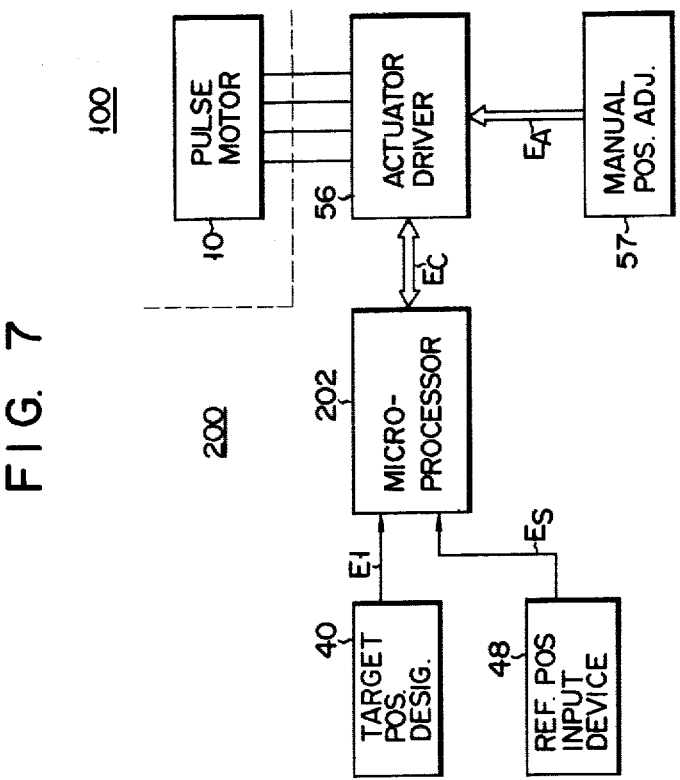
Figure 6:
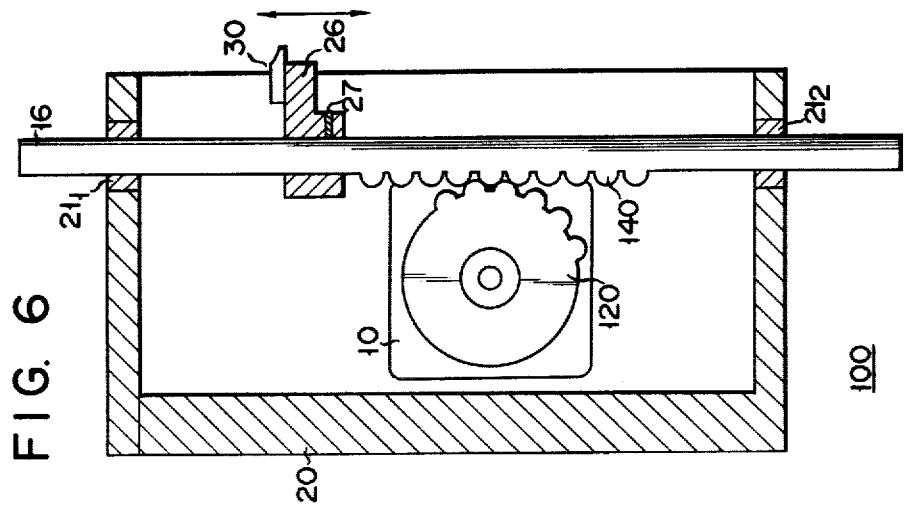
Figure 8:
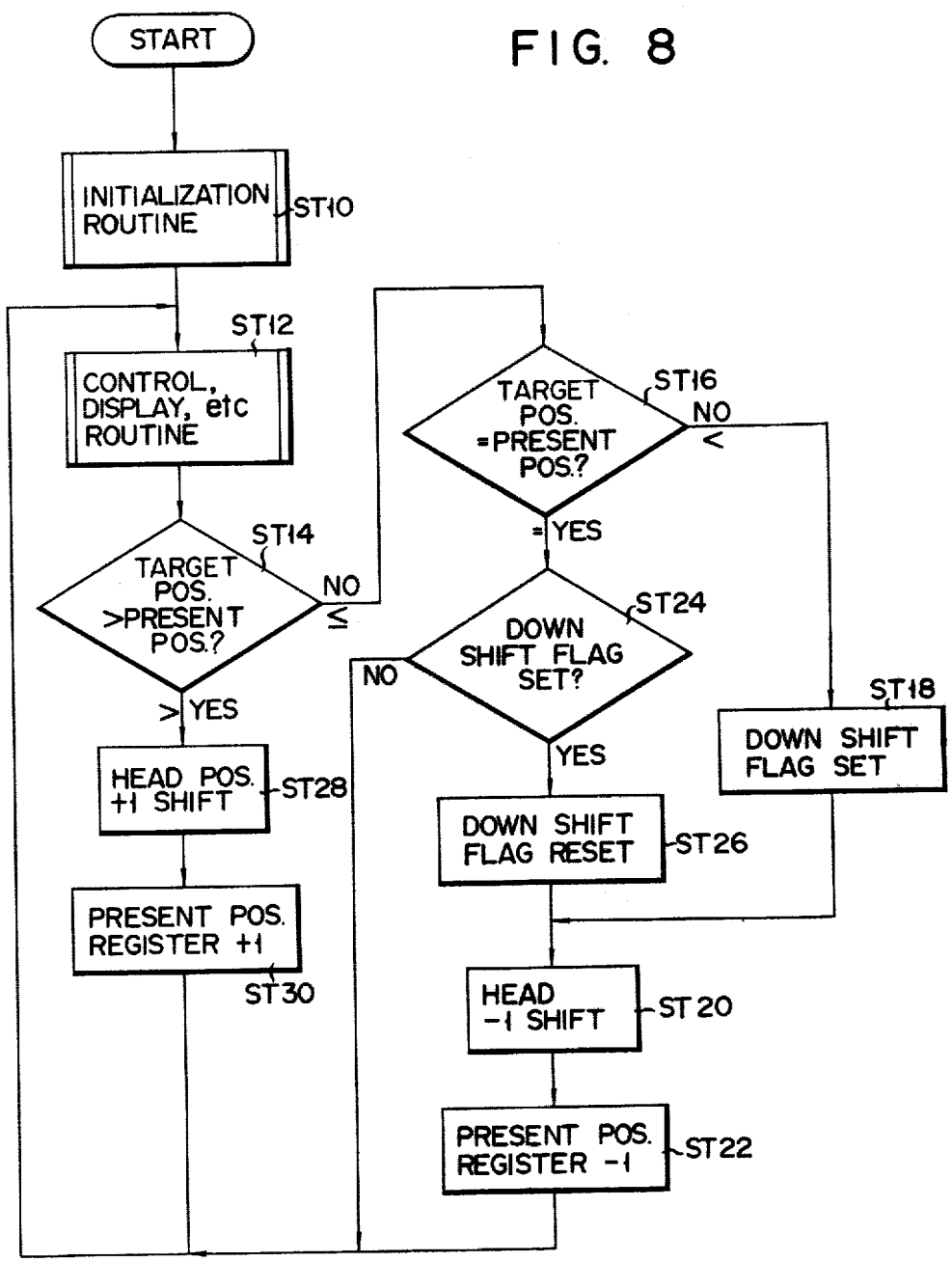
Figure 9:
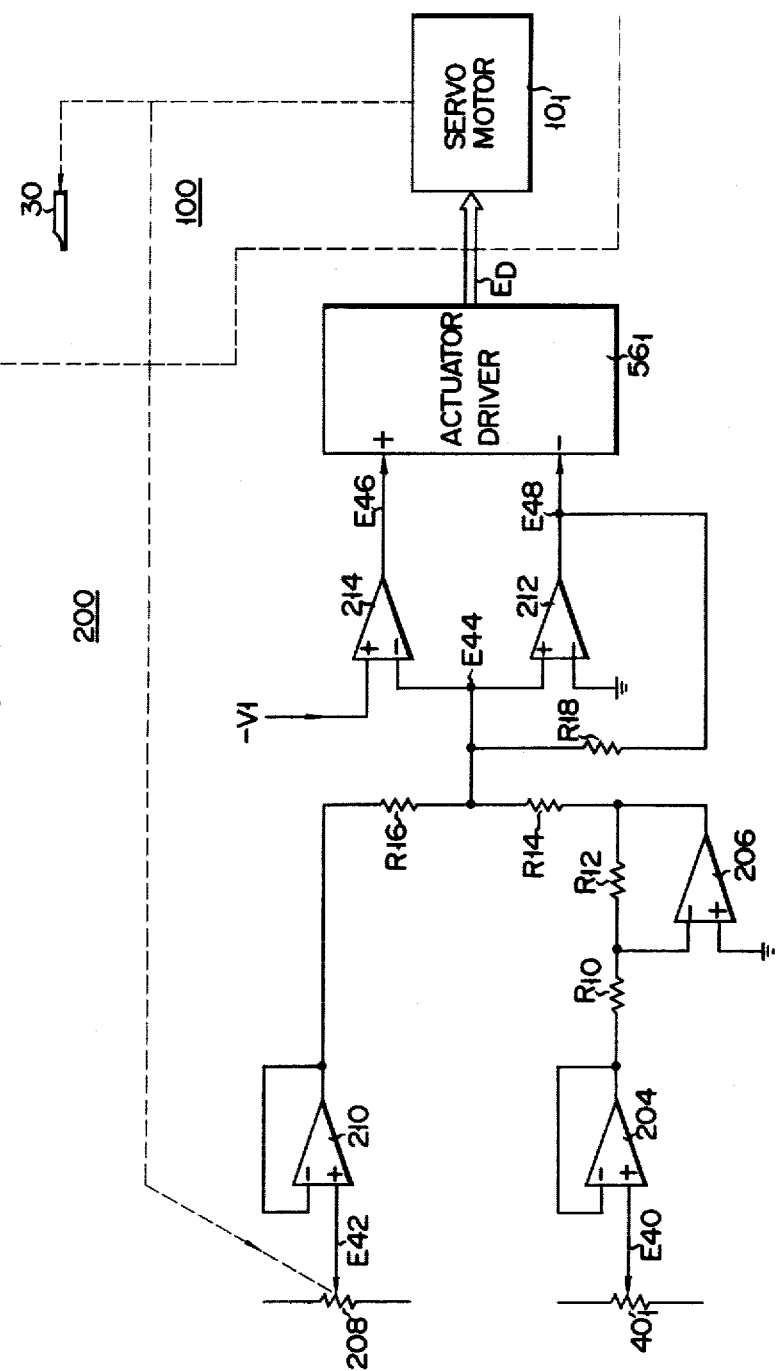

FIG. 2F shows a block diagram for initializing the memories 42 and 46 of FIG. 2 after the power ON, wherein the memories 42 and 46 are RAM;

FIG. 2G shows a flow chart representing how to decide the contents of the memories 42 and 46 shown in FIG. 2 after the power ON;

FIGS. 3 and 4 show graphs for illustrating the operation of the control section shown in FIG. 2;

FIG. 5 shows a cross sectional view of a modification of the actuator section shown in FIG. 1 where the head moves up and down, being fixed to an external thread;

FIG. 6 shows a cross sectional view of another modification of the actuator section shown in FIG. 1 where the head is moved up and down by means of a gear mechanism;

FIG. 7 shows a block diagram of the control section where a major part of the control section shown in FIG. 2 is comprised of a microprocessor;

FIG. 8 shows a flow chart when a program used in the control section shown in FIG. 7 is executed;

FIG. 9 shows a circuit diagram of the control section when an analog servo circuit is used for a major portion of the control section shown in FIG. 2;

FIG. 9A shows a modification of the comparator 212 part shown in FIG. 9; and

Figure 11:
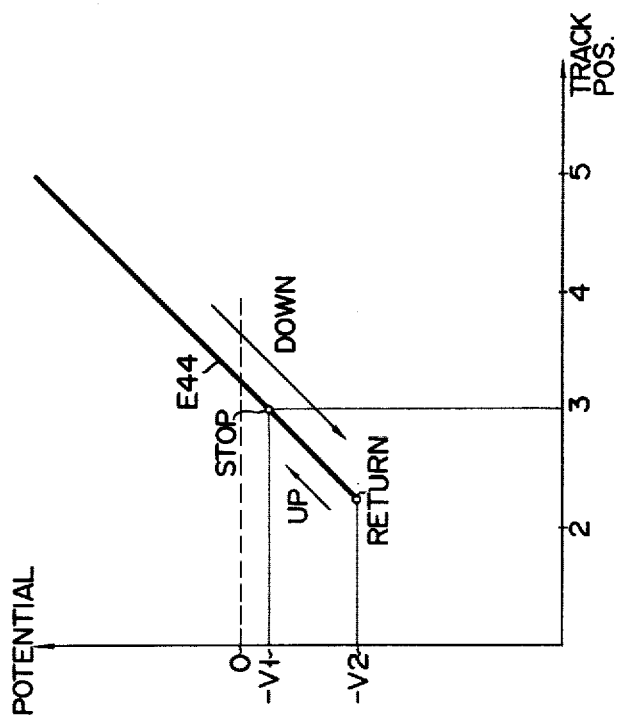
Figure 10:
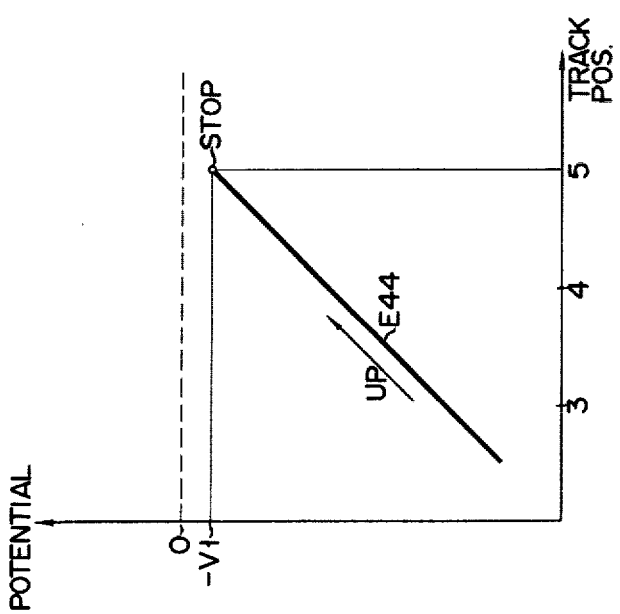

FIGS. 10 and 11 show graphs for illustrating the operation of the control section shown in FIG. 9.

The invention will be described in detail with reference to the accompanying drawings. For simplicity, like or equivalent portions are designated by like or similar reference symbols throughout the accompanying drawings.

In FIG. 1 illustrating an actuator section 100 for moving up and down a magnetic head, a gear 12 is fixed to the rotating shaft of a pulse motor (step motor) 10. A pinion 14 in mesh with the gear 12 is fixed to a shaft 16 with an external thread formed therein. The shaft 16 is rotatably supported by bearings 22 and 24 provided at the upper and lower ends of the frame 20. The external thread portion 18 of the shaft 16 supported between the bearings 22 and 24 is slidably in mesh with the internal thread 28 of a moving bed 26. Guide members (not shown) are provided on both sides of the bed 26, extending vertically as viewed in the drawing, in order to prevent the bed 26 from rotating with the rotation of the shaft 16. A magnetic head 30 slidably in contact with a magnetic tape (not shown) is attached to the top end portion of the bed 26.

When the motor 10 rotates, the rotation of the motor 10 is transmitted through the gear 12 and the pinion 14 to the shaft 16. With the rotation of the shaft 16, the external thread 18 rotates so that the bed 26 coupled with the external thread 18 moves up and down. This vertical movement of the bed 26 causes the head 30 to shift or move across recording tracks on the magnetic tape.

FIG. 2 shows a control section 200 for driving and controlling the actuator section 100 shown in FIG. 1. The target position (track number or track position) of the head 30 is determined by a first signal E1 derived from a target position designator 40. The designator 40 is a keyboard with a number of keys arranged in the order of the track numbers. The signal E1 is stored into a target position memory 42 such as ROM. When the memory 42 is addressed by the designator 40, a second signal E2 is read out from the address location specified by the memory 42. When the number of tracks is 128, ranging from track 0 to track 127, a binary code of 7 bits is used for representing the signal E2. The signal E2 is "0000101" when the designator 40 designates the 5th track, for example.

The signal E2 is inputted into a first comparator 44 which compares the signal E2 with a third signal E3 read out from a present position memory 46. The memory 46 may be a memory permitting the read and the write such as RAM. To initialize the memory 46, a reference signal Es is inputted from a reference position input device 48 into the memory 46. The signal Es is obtained when the 0th position is detected after a power source of the FIG. 2 control section is turned on and serves as reference information to determine an absolute track position of the memory 46. How the signal Es is prepared will be described later.

The signals E2 and E3 are compared by the comparator 44. When the signal E2 includes data "0000101" repesenting the 5th track and the signal E3 includes data "0000000" representing the 0th track, E2>E3. In this case, the comparator 44 produces a 4th signal E4 of logical "1" and the signal E4 is inputted to the first input terminal of an AND gate 50. When E2>E3, a 5th signal E5 applied from the comparator 44 to the set input terminal of an R-S flip-flop 52 is logical "0". For this, the flip-flop 52 is not set and a 6th signal derived from the output terminal Q of the flip-flop 52 is logical "0". The signal E6 is inverted by an inverter 54 to become a 7th signal E7. The signal E7 is applied to the second input terminal of the AND gate 50. At this time, the signals E4 and E7 are both logical "1", so that the AND gate 50 produces an 8th signal E8 of logical "1".

The signals E6 and E8 are applied to the DOWN and UP input terminals of an actuator driver 56 of the conventional type. The driver 56 includes a bidirectional shift register and a clock generator. When the driver 56 has a logical "1" applied-thereto at the UP input terminal, the shift register shifts to the right by the pulse of the generator and when the DOWN input terminal is logical "1", it shifts the contents thereof to the left. When both the input terminals are logical "0", the shift register does not effect the shift. In this case, E6=0 and E8=1, and therefore the right shift is performd within the driver 56. To the driver 56 is connected a 4-phase pulse motor 10 which rotates in accordance with the contents of the shift register. If the one-bit shift of the contents of the shift register corresponds to the movement of one track, the driver 56 produces an increment signal S1 every time the shift register shifts one pulse to the right during the period that E6=0 and E8=1. Every time the head 30 in FIG. 1 ascends by one track with the rotation of the motor 10, one pulse of the signal S1 is produced. Every time the signal S1 is produced, the motor 10 rotates by 15 degrees and the head 30 moves the distance of 40 μm, for exaample, of one track.

The signal S1 is applied to the addition input terminal of the memory 46. The contents of the memory 46 is incremented by "1" every one pulse of the signal S1. At the initial state, when the head 30 positioned at the 0th track reaches the 1st track, the signal S1 is produced and the contents of the memory 46 is incremented by "1". Upon the increment of "1", the signal E3 read out from the memory 46 is changed from "0000000" to "0000001". When the signal E2 is "0000101" representing the 5th track, E2>E3. In this case, E4=1, E5=0, E6=0, E7=1, E8=1 and the states of those signals holds the state before the signal S1 is produced. Accordingly, the right shift continues within the driver 56, so that the motor 10 continues its rotation in the direction to lift the head 30. With the progression of the right shift, the 5th pulse is generated. At this time, the signal E3 becomes "0000101". Then, the signal E2 is equal to the signal E3, E2=E3, the signal E4 and E5 produced from the comparator 44 are both logical "0". In this case, the flip-flop 52 is not set and therefore the signal E6 remains "0" and the signal E8 becomes logical "0". Accordingly, the shift within the driver 56 stops and the motor 10 stops at a position corresponding to the 5th track.

How the absolute track address of the memory 46 is determined immediately after the power source is turned on will be described. At the initial stage when power is fed into the apparatus, the electrical information relating to the location of the head 30 is left erased. Therefore, immediately after the power source is turned on, the 0th track must be detected firstly. In this case, the following points must be taken into consideration. Immediately after the power source is turned on, the phases of the starting currents fed from the driver 56 to the motor 10 are unstable, so that, in some phase of the starting current, when the rotor of the motor 10 rotates up to the position indicated by the phase, the head 30 may be positioned on a more negative or lower side than the 0th track position.

An arrow 300 shown in FIG. 2A indicates that the tracking error to the negative side take place at the initial stage after the power source is turned on. In order to prevent the head tracking error, the following operation is performed. Immediately after the power source is turned on, a given number of pulses corresponding to 6 tracks, for example, are fed to the motor 10, so that the head 30 is reliably positioned on the positive or upper side of the 0th track position. See an arrow 310 in FIG. 2B. After this step, the head is driven in the negative direction to seek the 0th track position. See an arrow 312 of FIG. 2B. When a 0th track signal representing the 0th track position or an end switch signal is detected, the head is driven by one track in the positive direction for eliminating the backlash (an arrow 314 in FIG. 2B). Then, the memories 42 and 46 are both set to "0000001" representing the 1st track and the head 30 stops its movement (an arrow 316 in FIG. 2B).

In the above-mentioned operation, when the head 30 is near the maximum track position at the time of the power source turn-on, the head might go beyond the maximum track position. See arrow 320 in FIG. 2C. This problem may be easily solved by if the head moving mechanism is designed to have an allowance of the amount of the distance beyond the maximum track position, e.g. 10 tracks, in the movement.

Turning now to FIGS. 2D and 2E, there is shown an example of the reference position input unit 48 to detect the 0th track signal or the end switch signal T3. To the shaft of the pulse motor 10 is mounted a first rotating disc 32 as well as the gear 12. A pinion 14 in mesh with the gear 12, together with a second rotating disc 34, is attached to the shaft 16. A light sensitive element such as a phototransistor 36 is mounted near the periphery of the disc 32. A light emission element, for example, LED 38, is mounted on the rotating path of the disc 34 which overlaps the rotating path of the disc 32.

Assume now that the number of the teeth of the gear 12 is different from that of the pinion 14 and thus a time taken for the disc 32 to rotate one time is different from that of the disc 34. On this assumption, it is for each given number of the rotations of each disc 32 and 34 that the transistor 36 faces the LED 38 each other. This indicates that the phase coincidence between two signals with different frequencies takes place once for a given number of periods. Accordingly, a point where the traansistor 36 faces the LED 38, i.e. a phase coincident point, may be set as the 0th track position or a head movement limit point. If so done, the 0th track position is detected when the transistor 36 responds to the light emitted from the LED 38. In other words, the 0th track position is detected by the end switch signal T3 outputted from the transistor 36 when it senses the light.

The number of the teeth Z1 and Z2 of the gear 12 and the pinion 14 are determined in the following manner. When the greatest common divisor (GCD) of the Z1 is M and the numbers of rotations of the gear 12 and the pinion 14 are n1 and n2, respectively, the following relation holds, $$Z1/Z2 = MP/MQ = n2/n1 \qquad (1)$$

Accordingly, $$P/Q = n2/n1 \qquad (2)$$

where P and Q are prime numbers, respectively. When the gear 12 rotates n1 times until the head 30 reaches the 0th track position, n2 to satisfy the equation (2) is obtained. On the basis of the rotations n1 and n2 thus determined, Z1 and Z2 to satisfy the equation (1) are determined.

If the transistor 36 is exchanged with the LED 38, the same result as that when those are not interchanged is obtained.

In the description referring to FIG. 2, the memory 42 is ROM serving as a code converter. Alternately, the memory 42 may be RAM to hold the first signal E1 applied from the designator 40. FIG. 2F shows an example to initialize the memory 46 at the time the power source is turned on with RAM as the memory 42. In operation, upon the turn-on of the power source, the timing signal generator 70 produces a first timing signal T1. The signal T1 is applied to switches SW1 and SW2 which in turn are turned to the contact a. As a result of the switching, the contents of the ROM 72, for example, the data of 6 tracks, "0000110", is loaded into the memory 42. At the same time, the contents of the ROM 78, "0000000", is loaded as the signal Es to the memory 46. Following this, the head 30 moves up by 6 tracks through the procedure mentioned above and stops.

After the head 30 is lifted by 6 tracks and the head stops, the generator 70 produces a second timing signal T2. A period from an instant that the first signal T1 is generated until the second signal T2 is generated is, for example, determined by a monostable multivibrator triggered by the signal T1. The maximum time from a time that the signal T1 is generated until the head 30 moves up by a given distance and then stops, may be previously learned, for example, by an experiment. The turn-on period of the monostable multivibrator is selected to be slightly longer than the maximum time.

The signal T2 is applied to the switches SW1 to SW4, so that these switches are turned to a contact b. The contents of the ROM 74, "0000001", is written into the memory 42. Simultaneously, the contents of the ROM 80 corresponding to the maximum track position, for example, data "1111111" representing 127 tracks, is written into the memory 46. Then, the head 30 falls through the procedure mentioned above under control of the control section shown in FIG. 2. In the course of the head descending, the input unit 48 as shown in FIG. 2E produces the end switch signal T3 which in turn is applied to the switches SW3 and SW4. Then, the switches SW3 and SW4 are turned to the contacts c, respectively. Through this switching, the contents "0000001" of the ROM 76 is written into the memory 42 and the contents "0000000" of the ROM 82 is written into the memory 46. As a result, the contents (E2) of the memory 42 becomes greater than the contents (E3) of the memory 46, so that the head 30 ascends again by one track and then stops.

Turning now to FIG. 2G, there is shown a block flow chart illustrating how the contents of the memories 42 and 46 are determined. The flow may be executed by using a conventional microprocessor.

Upon the power-on, a step ST100 initializes the contents of each register. A step ST102 loads the initializing data, for example, data of 6 tracks, into an up-time register UTR (not shown) contained in the microprocessor. Then, a step ST104 produces a one-step-up signal corresponding to one track of the head 30. In a step ST106, data "1" is subtracted from the register UTR and the program execution progresses through a step ST108 to a step ST110. The step ST108 provides a time delay to compensate for a response delay of the pulse motor 10 driven by the one-step-up signal. This time delay is performed also in steps ST114 and ST126. The step ST110 checks as to if the contents of the register UTR is zero or not. When the check shows NO ($\neq 0$), the program execution step returns to the step ST104 and the program flow loop of ST104 to ST110 is repeated until the register UTR becomes zero in the contents. In the step ST102, when the data "6" loaded into the register UTR is "6", the loop is repeated five times.

When YES (=0) is obtained in the step ST110, the program execution progresses to a step ST112. In the step ST112, a one-step-down signal to descend the head 30 by one track is produced. The steps ST104 to ST112 correspond to the arrow 312 shown in FIG. 2B. Then, the program execution advances through a step ST114 to a step ST116. In the step ST116, the end switch signal T3 representing the 0th track position is inputted thereinto. Then, in the step ST118, it is checked if the end switch input is ON or not. In the step ST116, when transistor 36 does not face the LED 38, the signal T3 is "0" and the end switch input is not ON. When NO is found in the step ST118, the CPU returns to the step ST112. The program flow of ST112 to ST118 is repeated until the step ST118 provides YES, that is to say, the transistor 36 faces the LED 38. This program flow corresponds, for example, to an arrow 324 in FIG. 2C. When the 0th track position is not yet detected even after the head 30 descends by 6+1 tracks, the loop of program flow ST112 to ST118 is repeated.

When YES is found in the step ST118, that is, the 0th track position is detected, the program execution advances to steps ST120 and ST122. In the step ST120, the data "0000000" representing the first track is loaded into the present position register or the memory 46. In a step ST122, the data "0000001" is loaded into the target position register or the memory 42. In the step ST124, the one-step-up signal like that in the step ST104 is outputted. After the time delay in a step ST126, CPU executes the regular routine.

To reduce an occurrence of an erroneous operation due to the track positioning error when the FIG. 2 device is used for a long time, it is possible to often perform the procedure shown in FIG. 2G when the FIG. 2 device runs. In the head forward feeding mode, for example, the head 30 is moved to the maximum track position and then is moved back (descended) by one track, and the 0th track position is detected there.

FIG. 3 illustrates how the above-mentioned track positioning is made. Specifically, when the head 30 is positioned below the 5th track, E2>E3. Accordingly, the right shift is performed within the driver 56 and the motor 10 rotates to move up the head 30. At an instant that the head 30 reaches the 5th track, the right shift operation within the driver 56 stops and the head 30 stops on the 5th track position. As described above, the one-track displacement corresponds to one-bit shift in the shift register within the driver 56. Alternately, the one-track displacement may be made to correspond to the one-bit or more shift amount, for example, 16 bits shift, of the shift register. In this case, when the one-track displacement is 40 μm, the head 30 moves 40/16=2.5 μm every time the shift register is shifted by one bit.

Generally, there is a variation of the characteristics of VTRs manufactured under the same standard, although the variation is within an allowable range. When a magnetic tape recorded by a VTR A is played back by another VTR B, there might occur a slight error in the track positioning, or tracking because of the characteristic variation. This track positioning or tracking error is quite different from that due to the backlash. When the track positioning error occurs, the position of the head 30 may be adjusted every 2.5 μm by manually shifting the contents of the shift register within the driver 56. The manual adjustment is conducted by a manual position adjustor 57 provided on a switch board or the like. When the switch No. "2" and a sign switch "+" of the adjustor 57 is turned on, the data $E_A$ corresponding to "+2" is transferred to the shift register. Then, the contents of the shift register is shifted to the right by 2 bits, so that the head 30 ascends by 5.0 μm.

When "−3" is inputted by the adjustor 57, the shift register is shifted to the left by 3 bits and the head 30 descends by about 7.5 μm. In this case, the backlash may be eliminated in the following manner. When "−" is designated by the adjustor 57, for example, when "−3" is designated, the data $E_A$ corresponding to "−4" is once applied from the adjustor 57 to the driver 56. After the data transfer is completed, that is to say, when the head 30 descends by about 10.0 μm, the data $E_A$ corresponding to "+1" is transferred to the driver 56. The transfer of the data "1" may be made manually and its automatic transfer is made in the following manner. When the data $E_A$ representing "−N" is designated by the switch, the adjustor 57 transfers the data $E_A$ representing "−(N+1)" to the driver 56 and then (after 0.5 second, for example) the data $E_A$ of "+1" to the driver. The delay of 0.5 second in the data transfer may be easily realized by using a simple logic gate and a monostable multivibrator.

The description thus far made relates to a case where the head 30 moves up toward the target track position. When the head 30 descends toward the target position, the operation is different from that of the former. Let us consider a case where the head 30 is moved down toward the 3rd track position. When the 3rd track is designated by the designator 40. The second signal E2 including a binary code "0000011" corresponding to the 3rd track is read out from the memory 42. The signal E2 is applied to a subtractor 58 where a given number of bit is subtracted from the signal E2. The result of the subtraction is applied to a second comparator 60 as a 9th signal E9. If the given number of bits is "1" (corresponding to one track), the signal E9 is "0000010".

The third signal E3 is applied from the memory 46 to the first and second comparators 44 and 60. The comparator 44 compares the signal E2 with the signal E3 and applies the 5th signal E5 to the set input terminal of the flip-flop 52. At this time, E2<E3 (0000011<0000101) and therefore the signal E5 becomes logical "1". The flip-flop 52 is set by the logic level "1". Upon the setting, the flip-flop 52 produces the 6th signal E6 of logical "1". The signal E6 is inverted by the inverter 54 and the 7th signal of logical "0" is inputted to the AND gate 50. At this time, the 8th signal E8 outputted from the AND gate 50 becomes logical "0". In this condition, the DOWN input terminal of the driver 56 and the UP input terminal have signal of "1" and "0", respectively. As a result, the left shift is performed in the shift register within the driver 56 and the motor 10 rotates in the direction to move down the head 30.

The driver 56 produces one decrement signal S2 every time the head 30 descends by one track. The signal S2 is inputted to the subtraction input terminal of the memory 46. The contents of the memory 46 is decremented by "1" for each pulse of the signal S2. When the head 30 is shifted from the 5th track to the 4th track, the 3rd signal E3 becomes "0000100" and when it moves above the 3rd track, the signal E3 becomes "0000011". When the 3rd track is designated as a target position, E2 is "0000011". Accordingly, when the head 30 descends to be positioned on the 3rd track, E2=E3. At this time, the signal E5 becomes logical "0" again, while the flip-flop 52 is left set. For this, the shift-register of the driver 56 continues its left shift operation and the head 30 descends to the second track. When the head 30 reaches the second track position, the signal E3 becomes "0000010". As described above, the signal E9 is "0000010". The signals E3 and E9 are compared by the comparator 60. When E9≧E3, the comparator 60 produces a 10th signal E10 of logical "1". The signal E10 is applied to the reset input terminal of the flip-flop 52. The flip-flop 52 is reset by the signal E10 which becomes logical "1" when E9=E3. Upon the reset, the signal E6 becomes logical "0" again.

When E9=E3, E2>E9 and therefore E2>E3. The logic level of the signal E5 outputted from the comparator 44 is "0" and the logic level of the signal E4 is "1". Since the signal E6 is logic level "0", the signal E7 becomes logical "1", so that the AND gate 50 is opened and the signal E8 becomes logical level "1". This state is the mode in which the shift register of the driver 56 effects the right shift. When the head 30 passes through the 3rd track to reach the 2nd track, the head 30 ascends again. When the head 30 is moved from the 2nd track to the 3rd track, the contents of the memory 46, i.e. the signal E3, is incremented from "0000010" to "0000011" in response to the increment signal S1 of one pulse. Accordingly, E2=E3 and the signal E4 becomes logical "0". At this time, the signal E5 is still logical "0", so that the flip-flop 52 is not set. Accordingly, the signals at the UP input terminal and the DOWN input terminal are both logical "0" and the motor 10 stops its rotation.

As described above, even when the target track position is located below the present track position, the head 30 finally reaches the target track position through its ascending operation. Accordingly, the position shift apparatus according to the invention is free from the tracking errors due to the backlash between the external thread 18 and the internal thread 28, and the backlash between the gear 12 and the pinion 14.

The movement of the track mentioned above is illustrated in FIG. 4. As seen from the graph in FIG. 4, when the head 30 is located higher than the 3rd track, E2<E3. For this, the flip-flop 52 is set and the shift register within the driver 56 performs the left shift and the motor 10 rotates in the direction to move down the head 30. Even when the head 30 descends to the 3rd track position, the flip-flop 52 remains set and therefore the head 30 further continues its descending operation. When the head 30 descends to the 2nd track position and E9=E3 holds, the flip-flop 52 is reset and the right shift is performed within the driver 56 and the motor 10 rotates in the direction to move up the head 30. The descending of the head 30 is switched to the ascending of it at the 2nd track position as a return point. As the head 30 reaches the 3rd track position, the right shift by the shift register stops and the head 30 stops at the 3rd track position.

In the above operation, the return point is below the stop point (target point) by one track. When the subtrahend in the subtractor 58 is 2 (decimal), the stop point is above the return point by two tracks, however. Further, when the reference signal Es in place of the 9th signal E9 is applied to the comparator 60, the return point is always the 0th track position. In this way, the setting of the return point may be made in any other suitable way. For example, the following method enables the return point to be set below the stop point by 0.5 track. In this case, one bit is additionally used at the least significant position of the 7-bit code representing the track position. In other words, the 3rd track position is represented by "00000110" and the second track position by "00000100". In this case, the middle point is set at the 2.5th track position, i.e. at the midway between the 2nd and 3rd tracks, which is represented by "00000101". The subtractor 58 subtracts "1" from the least significant digit of the 8-bit code. Further, the increment signal S1 and the decrement signal S2 are produced every 0.5 track of the head movement. Accordingly, the comparisons by the comparators 44 and 60 are performed for each 0.5 track, so that the return point may be set below the stop point by 0.5 track.

FIG. 5 shows a modification of the actuator section 100 shown in FIG. 1. The gear 12 mounted to the rotating shaft of the pulse motor 10 meshes with the pinion 14. The pinion 14 is mounted to the periphery of a collar 29 with an internal thread 28 formed therein. A shaft 16 with an external thread 18 is screwed into the threaded hole of the collar 29. The external thread 18 is shaped like a column and the shaft 16 is hexagonally shaped. The hexagonal shaft 16 is inserted into a bearing 21 in a hexagonal opening at the upper end face of a frame 20. The reason why the hexagonal column is used is to prevent the shaft 16 from rotating. A movable head 26 is fixed to the hexagonal column portion of the shaft 16 by means of screw 27. The magnetic head 30 is fixed onto the top end of the bed 26. When the motor 10 rotates, the collar 28 is also rotated through the combination of the gear 12 and the pinion 14. Since the shaft 16 is inserted into the hexagonal bearing 21, it can be slidable vertically but can not be rotated. Accordingly, when the collar 29 is rotated, the shaft 16 is screw-fed up or down, so that the track position of the head 30 is changed.

FIG. 6 shows another modification of the actuator section 100 shown in FIG. 1. A gear 120 is attached to the rotor shaft of a pulse motor 10. The gear 120 meshes with a rack 140 formed on a shaft 16. The shaft 16 is inserted into bearings $21_1$ and $21_2$ provided on the upper and lower end faces of a frame 20. A moving bed 26 with a magnetic head 30 attached thereto is fixed to the shaft 16 by means of screw 27. When the motor 10 rotates at a given angle, the shaft 16 is moved vertically through the combination of the gear 120 and the rack 140. Upon this, the head 30 is shifted corresponding to the angle of the rotation of the motor 10. In this case, the backlash is presence between the gear 120 and the rack 140; however, the tracking error due to the backlash is removed when the actuator 100 is used in combination with the control section 200 shown in FIG. 2.

As described above, in order to position the head 30 at a target track position by moving down the head 30, the head 30 passes the target track and is returned. In other words, the head 30 is positioned at the target position always through the ascending of the head 30. In this way, the tracking error due to the backlash is eliminated. Alternately, the positioning of the magnetic head 30 at the target position may be attained through the descending of the head. In this case, the basic construction is substantially the same as that shown in FIGS. 1 and 2. The simplest way to realize this is to reverse the actuator section 100 upside down. If it so done, the head 30 reaches the target track position through only the descending of the head 30, and stops thereat. Alternately, by modifying the wirings of the driver 56 and the motor 10 so as to reverse the shifting direction of the driver pulse, the rotational direction of the motor 10 is reversed.

When the actuator section 100 shown in FIG. 1, 5 or 6 is laid down, the head 30 may be moved horizontally. Further, when a couple of the actuator sections are orthogonally arranged, the head 30 may be moved to a proper point on a two-dimensional plane. The head shift apparatus according to the invention is not limited to the magnetic head 30 but applicable for any object which must be positioned free from the positioning error due to the backlash.

FIG. 7 shows a modification of the control section 200 shown in FIG. 2 in which the circuit components 42, 44, 46, 50, 52, 54, 58 and 60 in FIG. 2 are replaced by a microprocessor (μCPU) 202. The processor 202 is initialized by a signal Es inputted from a reference position input device 48 and supplies a control signal Ec to an actuator driver 56 on the basis of a first signal E1 transferred from a target position designator 40.

A block flow chart for illustrating the operation of the control circuit shown in FIG. 7 is illustrated in FIG. 8. In a step ST10, the processor 202 is initialized. In a step ST12, the routines of control, display and head position direction and the like are performed. In the step ST14, it is checked if the target track is above or below the present position of the head. When it is located below the present position, that is, when NO is found in the step ST14, a step ST16 is executed. The step ST16 checks if the target track position is the same as the present position of the head or not. When the target track position is below the present position, that is, when NO is found in the ST16, a step ST18 is executed. The step ST18 sets a down-shift flag to indicate the descend of the head position. In a step ST20, a descending shift of the head by one track is performed and in a step ST22 the contents of the present position register representing the head position is decremented by one. Then, the program execution returns to the step ST12.

In the step ST12, the above-mentioned routine is executed and then the step ST14 is executed. When the target track position is coincident with to the present position of the head, the program flows to a step ST24 through NO of the step ST14 and the step ST16. The step ST24 checks if the down-shift flag is set or not. In the step ST18, the flag is set and thus the step ST24 provides YES, so that the program flows to a step ST26. The step ST26 resets the down-shift flag and then the step ST20 is executed. The step ST20 performs the descending shift of the head by one track and the step ST22 decrements the present position register by 1, and then program returns to the step ST12. At this time, the head has been shifted below the target track position by one track. This time point corresponds to a return time point.

In the step ST12, the control routine and the like are executed and then the program flows back to the step ST14. In this case, the target track position is located above the present position of the head, that is, YES is found in the step ST14. The program reaches a step ST28. In the step ST28, the head is moved up by one track and in a step ST30, the present position register is incremented by 1. Then, the program returns to the step ST12. At this time, the head is set at the target track position. In the step ST12, a given routine is executed again, and the program advances to the step ST14. Since the head position is coincident with the target track position, the program flows to the step ST24, through NO of the step ST14 and YES of the step ST16. At this time, the down-shift register has been reset (ST26), that is, NO is found in the step ST24, so that program execution step returns to the step ST12.

Subsequently, the loop of the program flow, ST12→ST14→ST16→ST24→ST12 is repeated so long as the target track position is not changed.

The description as mentioned above relates to the program flow to execute the head position shift as shown in FIG. 4. The head position shift as shown in FIG. 3 is performed under the following program flow. The step ST10 initializes the processor 202, the step ST12 executes a given routine, and the step ST14 is executed. At this time, if the target track position is above the present position of the head, that is, if the step ST14 provides YES, the program flows to the step ST28. The step ST28 moves up the head by one track, the step ST30 increments the contents of the present position register by one, and the program flows back to the step ST12.

The program repetitively flows through the loop ST12→ST14→ST28→ST30→ST12 until the target track position is coincident with the present position of the head. When the target track position is coincident with the present head position, the program flows to the step ST24 through NO of the step ST14 and YES of the step ST16. At this time, since the down-shift flag is not set, that is, the step ST24 provides NO, the program returns to the step ST12. So long as the target track position is not changed, the program circulates through the loop ST12→ST14→ST16→ST24→ST12.

FIG. 9 shows a block diagram of another modification of the control section shown in FIG. 2 in which an analog servo circuit is used for a major port of the control section. The slider of a potentiometer $40_1$ corresponding to the target position designator 40 in FIG. 2 is coupled with the inverted input terminal of an operational amplifier 206, through a buffer amplifier 204 and a resistor R10. The operational amplifier 206 is connected at the non-inverted input terminal to ground and at the output terminal to the inverted input terminal through a resistor R12 in negative-feedback manner. The slider of a potentiometer 208 connected to a servo motor $10_1$ of the actuator 100 is inputted to a buffer amplifier 210. The output terminal of the operational amplifier 206 is connected to that of the buffer amplifier 210, through resistors R14 and R16. The connection point between the resistors R14 and R16 is connected to the inverted input terminal of the comparator 214 and the non-inverted input terminal of the comparator 212 which are constructed by operational amplifiers. The inverted input terminal of the comparator 212 is grounded. A potential $-V1$ to provide a non-sensitive zone for preventing oscillation is applied to the non-inverted input terminal of the comparator 214. The output terminal of the comparator 212 is coupled with the non-inverted input terminal of the comparator 212, through a resistor R18.

The output terminals of the comparators 214 and 212 are connected to the + input terminal of an actuator driver $56_1$ and the − input terminal of the same, respectively. The driver $56_1$ is constructed by an analog circuit of the conventional type. The output signal $E_D$ of the driver $56_1$ is coupled with the servo motor $10_1$. The servo motor $10_1$ shifts the head 30 on the basis of the signal $E_D$. The amount of the head shift is fed back to the potentiometer 208 to form a servo loop.

Applied to the comparators 212 and 214 is a voltage E44 corresponding to a difference between a slider voltage E40 of the potentiometer $40_1$ and a slider voltage E42 of the potentiometer 208. Let us consider now a state, as shown in FIG. 10, that the target track "5" is above the present position of the head 30 and E44 $< -V1$. In this case, the output voltage E46 of the comparator 214 is at a high level logical "1". On the other hand, the output voltage E48 of the comparator 212 is at a low level logical "0". At this time, the driver $56_1$ produces a signal $E_{D1}$ to rotate forwardly the servo motor $10_1$. With the forward rotation of the servo motor $10_1$, the head 30 ascends while at the same time the slider of the potentiometer 208 slides to rise the voltage E42. As a result of the rise of the voltage E42, the voltage E44 slightly exceeds the potential $-V1$ so that the voltage E46 becomes logical "0" in level. At this time, the voltage E44 is still less than 0, E44 $< 0$, and therefore the voltage E48 is also logical "0". When the voltages E46 and E48 are both logical "0", the forward rotation of the servo motor $10_1$ stops and the head 30 stops at the target track position "5".

Let us consider a state, as shown in FIG. 11, that the target track position "3" is below the present position of the head 30, and E44>0. In this case, the voltage E46 is logical "0" and the voltage E48 is logical "1". The E48 of logical "1" is fed back through the resistor R18 to the inputs of the comparators 212 and 214. When the voltage E48 becomes logical "1", the driver $56_1$ produces a signal $E_{D2}$ for reversely rotating the servo motor $10_1$. With the reversal rotation of the servo motor $10_1$, the head 30 descends and the voltage E44 also decreases correspondingly.

Note here that even if the slider positions of the potentiometers $40_1$ and 208 are coincident with each other, or the voltages E40 and E42 are fixed, the voltage E44 changes depending on the output level of the comparator 212. To be more specific, when the voltage E48 is logical "1", the input levels of the comparators 212 and 214 are pulled up to high potential. Therefore, even when the slider of the potentiometer 208 reaches the position corresponding to E44=0 when the head 30 ascends, the voltage E44 actually is more than 0, E44>0. Accordingly, the servo motor $10_1$ further continues its rotation. Assume now that the head 30 exceeds the target track position "3" and further descends, and that the slider of the potentiometer 208 reaches the position corresponding to E44=−V2. This position corresponds to E44=0. When the voltage E44 apparently is slightly lower than the potential −V2 (actually, $0 \geq E44 > -V1$), the output voltage E48 of the comparator 212 becomes logical "0" again. At this time, the potential of the voltage E44 instantaneously descends, so that E44<−V1 and the state as shown in FIG. 10 is obtained. Accordingly, the voltage E46 becomes logical "1" and the voltage E48 becomes logical "0", so that the servo motor $10_1$ is forwardly rotated. Then, when the voltage E44 slightly exceeds the potential −V1, that is, the head 30 ascends to reach the target track position "3", the voltages E46 and E48 become both logical "0" to stop the rotation of the motor $10_1$.

FIG. 9A shows a modification of the control section shown in FIG. 9. As shown, in the control section in FIG. 9, the voltage E48 is fed back to the non-inverted input terminal of the comparator 212 through a resistor R18. In the modification shown in FIG. 9A, the voltage E48 is fed back to the inverted input terminal of the comparator 212, through an inverter 213 and a resistor R17. The inverted input terminal of the comparator 212 is grounded through a resistor R19. When the transfer function of the inverter 213 is −1, resistors R17 and R19 correspond to the resistors R18 and R14//R16 in FIG. 9. When the circuit shown in FIG. 9A is applied to the circuit of FIG. 9, the basic operation of the FIG. 9A circuit is substantially the same as that of the FIG. 9 circuit.

As seen from the foregoing description, the backlash between the feeding screw portion (18, 28) is left as it is without eliminating the backlash and, when moved toward the target track position in either up or down direction, the head 30 is moved with the backlash being deviated in one direction. Therefore, the head shift apparatus according to the invention enables the head to position accurately at the target position irrespective of the adverse effect by the backlash. Further, the friction load due to the tightening of the feed screw section is considerably reduced, with the result that a small type pulse motor with small output torque may be used for the head shift apparatus and thus the apparatus may be made small in size and light in weight as a whole.

Although a specific construction has been illustrated and described herein, it is not intended that the invention be limited to the elements and the constitution disclosed. One skilled in the art will recognize the particular elements or sub-constructions may be used without departing from the spirit of the invention.

What we claim is:

1. A position shift apparatus for shifting the position of a head provided in a fixed head type VTR to a target position relative to recording tracks provided on a recording medium, comprising:
   actuator means on which said head is mounted for varying the position of said head, including
   screw feeding or shaft movement means having first and second threaded portions meshingly engaged for varying the position of said head, one of said threaded portions adapted to be rotated to shift translationally the other of said threaded portions on which said head is mounted to shift the position of said head in dependence on the rotation and rotational direction of said one of said threaded portions;
   control means for controlling said actuator means such that said one of said threaded portions is always rotating in a predetermined first direction immediately prior to said head being stopped on said target position upon varying of the position of said head, including
   means for determining whether said head is displaced in a first direction or a second direction with respect to said target position,
   means for shifting said head in a first direction directly to said target position by selected directional rotation of said one of said threaded portions until said head reaches said target position when said head is displaced in the first direction with respect to said target position, and
   means for shifting said head in a second direction opposite to the first direction by oppositely selected rotation of said one of said threaded portions when the head is displaced in the second direction with respect to said target position, said second direction shifting means including means for shifting said head in said second direction by a predetermined amount past said target position and means for then actuating said first direction shifting means to shift said head said predetermined amount in said first direction to stop said head at said target position.

2. A position shift apparatus according to claim 1, further comprising:
   said actuator means including a pulse motor as a drive source for varying the position of said head; and
   said control means comprising,
   driver means for rotating the pulse motor forwardly or reversely,
   first means for providing first data corresponding to the target position of the head,
   second means coupled with the driver means for providing second data corresponding to the present position of the head, and
   third means for providing to the driver means a first command to rotate the pulse motor in the forward direction when the first data is larger than the second data as a result of the comparison thereof, whereby the head is shifted by effecting the shaft-movement or the screw-feeding in the first direction.

3. A position shift apparatus according to claim 2, wherein said control means further comprises:
   fourth means for providing third data corresponding to the predetermined distance by which the head passes the target position during the shaft movement or the screw-feeding in the second direction, and
   fifth means for applying to the driver means a second command to rotate the pulse motor in the reverse direction when the third data is larger than the second data as a result of the comparison of the second data with the third data, and which stops the supply of the second command when the second data is larger than the first data,
   whereby the head is shifted in the second direction past the target position by the predetermined amount during a period of the supply of the second command, and the head is then shifted through the shaft-movement or the screw-feeding in the first direction by the predetermined amount when the supply of the second command is stopped and the first data is larger than the second data.

4. A position shift apparatus according to claim 1, further comprising:
   said actuator means including a servo motor as a drive source for the shaft movement or the screw feeding;
   said control means comprising,
   driver means for rotating the servo motor in a forward direction or a reverse direction;
   first means for providing a first signal corresponding to a target position of the head;
   second means coupled with the servo motor to provide a second signal corresponding to the present position of the head;
   means for comparing said first and second signals to form a difference therebetween at a summing point;
   third means for providing a third signal for supplying a first output from the driver means to the servo motor in order to rotate the servo motor in the forward direction when the difference between the first and second signals is smaller than a first given level;
   whereby the head is shifted by effecting the given amount of the shaft-movement or the screw-feeding in the first direction.

5. A position shift apparatus according to claim 4, wherein said control means further comprises:
   fourth means for providing a fourth signal for supplying a second output signal from the driver means to the servo motor to rotate the servo motor in the reverse direction when the difference between the first and second signals is higher than a second given level; and
   fifth means for feeding back the fourth signal to the summing point of the difference for providing a third given level corresponding to the predetermined amount the head passes the target position during shift movement or screw feeding in the second direction,
   whereby the head is shifted in the second direction by the shaft-movement or the screw-feeding said predetermined amount past said target position when the fourth signal is provided, and the head is thereafter shifted in the first direction by said predetermined distance when the supply of the fourth signal is stopped and the third signal is supplied.

6. A position shift apparatus according to claim 4, wherein said control means further comprises:
   fourth means for providing a fourth signal for supplying a second output signal to rotate the servo motor in the reverse direction from the driver means to the servo motor when the difference between the first and second signals is higher than a second given level; and
   fifth means for feeding back the fourth signal with a phase inversion to a point of the fourth means for establishing the second given level for providing a third given level corresponding to the predetermined amount the head passes the target point during shift movement in the second direction,
   whereby the head is shifted in the second direction said predetermined amount past the target position when the fourth signal is provided, and the head is thereafter shifted in the first direction by the predetermined amount when the supply of the fourth signal is stopped and the third signal is supplied.

7. A position shift apparatus according to claim 1, further comprising:
   said actuator means including a pulse motor as a drive source for effecting the screw-feeding or the shaft-movement; and
   said control means comprising,
   driver means for rotating the pulse motor forwardly or reversely,
   first means for providing first data corresponding to the target position of the head,
   second means coupled with the driver means for providing second data corresponding to the present position of the head, and
   third means for providing to the driver means a first command to rotate the pulse motor in the forward direction when the first data is smaller than the second data as a result of the comparison thereof,
   whereby the head is shifted by effecting the shaft-movement or the screw-feeding in the first direction.

8. A position shift apparatus according to claim 7, wherein said control means further comprises:
   fourth means for providing third data corresponding to the predetermined amount by which the head passes the target position during the shaft movement of the screw-feeding in the second direction and;
   fifth means for applying to the driver means a second command to rotate the pulse motor in the reverse direction when the third data is smaller than the second data as a result of the comparison of the second data with the third data, and which stops the supply of the second command when the second data is smaller than the first data,
   whereby the head is shifted through the shaft-movement or the screw-feeding in the second direction past the target position by the predetermined amount during a period of the supply of the second command, and the head is shifted through the shaft-movement or the screw-feeding in the first direction by the predetermined amount when the supply of the second command is stopped and the first data is smaller than the second data.

9. A position shift apparatus according to claim 1, further comprising:

said actuator means including a servo motor as a drive source for the shaft movement or the screw feeding; and said control means comprising,
driver means for rotating the servo motor in a forward direction or a reverse direction;
first means for providing a first signal corresponding to a target position of the head;
second means coupled with the servo motor to provide a second signal corresponding to the present position of the head;
means for comparing said first and second signals to form a difference therebetween at a summing point;
third means for providing a third signal for supplying a first output from the driver means to the servo motor in order to rotate the servo motor in the forward direction when the difference between the first and second signals is larger than a first given level,
whereby the head is shifted by effecting the given amount of the shaft-movement or the screw-feeding in the first direction.

10. A position shift apparatus according to claim 9, wherein said control means further comprises:
fourth means for providing a fourth signal for supplying a second output signal from the driver means to the servo motor to rotate the servo motor in the reverse direction when the difference between the first and second signals is lower than a second given level; and
fifth means for feeding back the fourth signal to the summing point of the difference for providing a third given level corresponding to the predetermined amount the head passes the target position during shift movement or screw-feeding in the second direction,
whereby the head is shifted in the second direction by said predetermined amount past said target position when the fourth signal is provided, and the head is thereafter shifted in the first direction by the predetermined amount when the supply of the fourth signal is stopped and the third signal is supplied.

11. A position shift apparatus according to claims 2 or 3, further comprising:
means for initializing the position of said head to a reference position upon application of power from a power source to said position shift apparatus, comprising,
timing signal generating means for producing a first timing signal and a second timing signal occurring after the first timing signal after the power source is turned on,
first switch means which responds to the first timing signal to supply first given data to the first means and the second means to initiate a predetermined movement of said head in said first direction;
second switch means which responds to the second timing signal after said predetermined movement to supply second given data to the first means and the second means to initiate a movement of said head in the second direction,
reference position input means for providing an end switch signal to define the reference position of the head, and
third switch means which responds to the end switch signal to provide third given data to the first means and the second means to initiate stopping of the head movement in the second direction and then to initiate a predetermined head movement in said first direction.

12. A position shift apparatus according to claim 11, wherein said reference position input means includes:
a first element rotated in conjunction with the rotation of the pulse motor,
a second element rotated in conjunction with the movement of the head,
wherein the rotating path of the second element has a portion overlapping a rotating portion of the first element, and
wherein when the first element faces the second element, a selected of the first or the second elements produces a signal corresponding to the end switch signal.

13. A process for controlling the shifting of position of a head provided in a fixed head type VTR which further includes a position actuator for moving the head, and control means to control the direction and amount of movement of the head, wherein the head is moved from an initial position to a target position, comprising:
comparing said target position with the initial head position and determining whether said target position is displaced in a first direction or a second direction with respect to the initial head position,
shifting the head directly to the target position in the first direction when the target position is displaced in the first direction relative to the initial position of the head;
shifting the head in the second direction a predetermined amount past the target position when it is determined that the target position is displaced in said second direction with respect to said head initial position, and then shifting said head in said first direction said predetermined amount such that the position of the head is coincident with said target position wherein said head always approaches said target position from said first direction immediately prior to being stopped on said target position.

14. A process according to claim 13, further comprising:
setting a flag when said target position is displaced in said second direction with respect to the initial head position;
resetting said flag when the position of the head is coincident with said target position after shifting of said head in said second direction and further shifting said head in said second direction by said predetermined amount upon resetting of said flag, whereupon said head is shifted in said first direction until coincidence of the head position and said target position.

15. A process for initializing a position shift apparatus provided in a fixed head type VTR, said apparatus including a position actuator for moving at least one VTR head relative to plural tracks providing in a recording medium and control means for controlling the direction and amount of movement of the head from an initial position of the head to a target head position, comprising:
(a) a step A for loading given initializing data to a first register;
(b) a step B for directing the actuator means to effect a predetermined head movement in a first direction after the preceding step is executed;

(c) a step C for subtracting unit data from the contents of the first register;

(d) a step D which judges if the contents of the first register is zero or not and returns to the step B when it is not zero;

(e) a step E for directing the actuator means to effect a head movement in a second direction opposite the first direction when the contents of the first register is zero in the step D;

(f) a step F which judges if an end switch input indicating that a 0th track position is detected is ON or not and returns to the step E when it is not ON;

(g) a step G for loading data indicating a predetermined track to a present position register representing the present position of the head and a target position register representing the target position of the head when the end switch input is ON in the step E.

* * * * *